United States Patent [19]

Itagaki et al.

[11] Patent Number: 5,033,116
[45] Date of Patent: Jul. 23, 1991

[54] CLOTHING FOR REDUCING FLUID RESISTANCE

[75] Inventors: Yoshihiko Itagaki; Shunsaku Kagechi; Masanori Fujimoto, all of Osaka, Japan

[73] Assignee: Descente Ltd., Osaka, Japan

[21] Appl. No.: 550,574

[22] Filed: Jul. 10, 1990

[30] Foreign Application Priority Data

Jul. 24, 1989 [JP] Japan ................................. 2-87144
May 7, 1990 [JP] Japan ................................. 1-47424

[51] Int. Cl.$^5$ .............................................. A41D 7/00
[52] U.S. Cl. .......................................... 2/67; 2/2.1 R; 2/238; 2/82; 441/55
[58] Field of Search .............. 2/67, 2.1 R, 2.1 A, 2/401, 238, 402, 82, DIG. 5; 441/55, 56, 59, 60, 65

[56] References Cited

U.S. PATENT DOCUMENTS

| | | | |
|---|---|---|---|
| 1,587,605 | 6/1926 | Scroggins | 441/59 |
| 1,962,984 | 6/1934 | Crego | 2/67 |
| 2,075,945 | 4/1937 | Hurt | 2/67 |
| 2,692,995 | 11/1954 | Bihan | 441/59 |
| 3,117,325 | 1/1964 | Shelton | 441/56 |
| 3,407,419 | 10/1968 | Drummond | 441/56 |
| 3,436,762 | 4/1969 | Cohan | 2/67 |
| 4,179,754 | 12/1979 | Denu | 2/67 |
| 4,306,317 | 12/1981 | Joseph | 2/67 |
| 4,343,044 | 8/1982 | Borda et al. | 2/67 |
| 4,654,894 | 4/1987 | Kudo | 2/67 |
| 4,916,755 | 4/1990 | Feigenbaum et al. | 2/67 |

FOREIGN PATENT DOCUMENTS

| | | | |
|---|---|---|---|
| 2334488 | 1/1975 | Fed. Rep. of Germany | 2/67 |
| 2607613 | 9/1977 | Fed. Rep. of Germany | 2/67 |
| 2935780 | 4/1981 | Fed. Rep. of Germany | 2/67 |
| 2565076 | 12/1985 | France | 2/67 |
| 0047404 | 3/1984 | Japan | 2/67 |
| 2068303 | 3/1990 | Japan | 2/67 |

*Primary Examiner*—Werner H. Schroeder
*Assistant Examiner*—Amy Brooke Vanatta
*Attorney, Agent, or Firm*—Oblon, Spivak, McClelland, Maier & Neustadt

[57] ABSTRACT

A clothing, such as swimwear and cycling wear, for reducing fluid resistance, air resistance and water resistance, by covering at least one portion adjacent to neck opening, side cuts and back cut of the clothing by means of a patch of a smooth-surfaced, airtight and waterproof sheet made of flexible resin sheet.

13 Claims, 5 Drawing Sheets

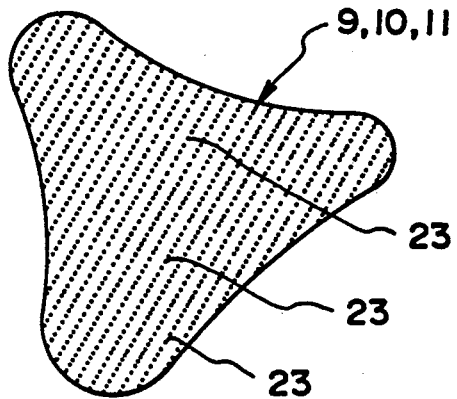
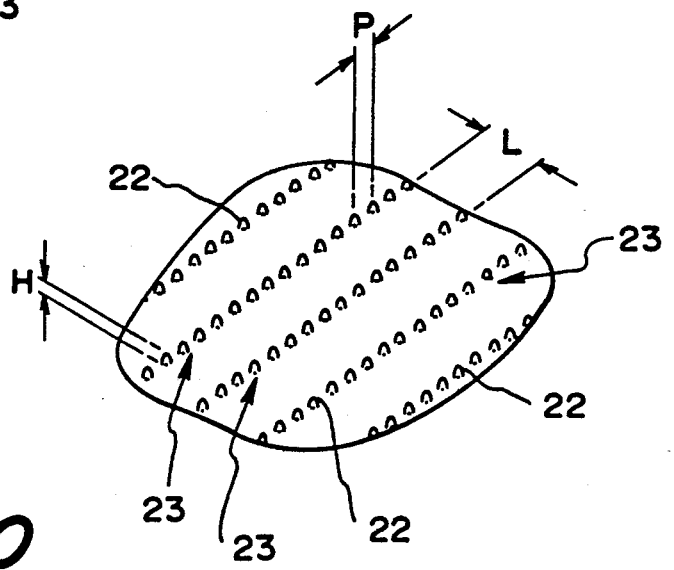
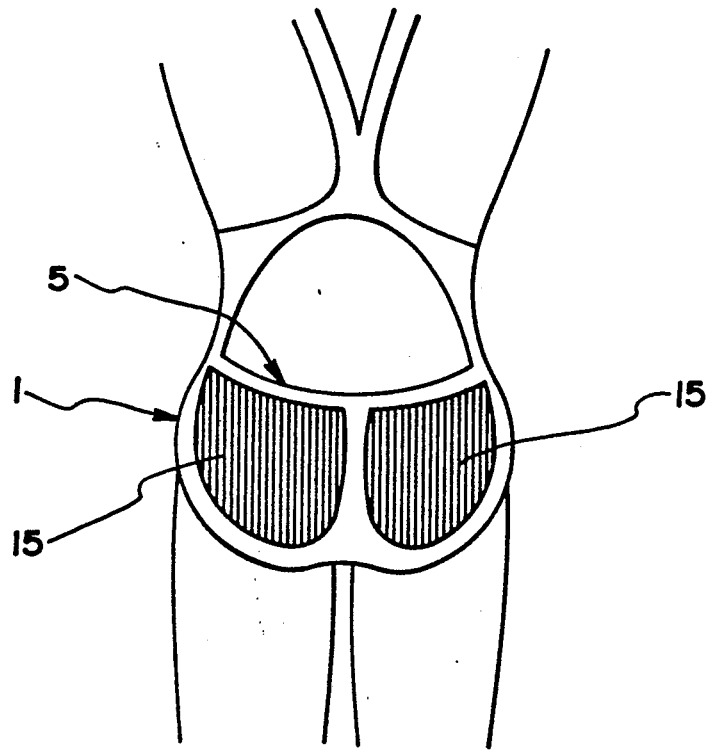

CLOTHING FOR REDUCING FLUID RESISTANCE

BACKGROUND OF THE INVENTION

The present invention relates to the area of technology concerned with reducing the resistance of sports clothing to fluids. It relates to clothing possessing favourable fluid resistance properties such as clothing used in speed-based competitive sporting events intended to reduce air resistance, as required, for example, in sports such as cycling and skating, and swimwear intended to reduce resistance to water especially in swimming tournaments.

In events such as cycling, skating, and swimming tournaments where the competitors are racing at speeds at which the final results are measured in units of a hundredth of a second, a conspicuous effect on the final time is exerted by fluid resistance in the form of resistance to air and water. For example, in the case of swimwear, especially in the case of women's competitive swimwear, it has been proven that the large degree of fluid resistance during swimming has the effect that differences in fluid resistance against water bring about important differences in the final results of an event. For this reason, research has for several years been conducted into how it might be possible to reduce resistance by means of improvements in the shape and design of swimwear, as well as into the surface state of swimwear materials. In the latter case, that is to say in the field of methods aimed at improving material quality, the technique generally employed has been to reduce fluid resistance against water by making the surface of the swimwear as smooth as possible.

However, women's swimwear in particular has several large openings such as around the neck and at the back and sides; for this reason, water and air inevitably intrude from these openings during swimming. Such intrusion of water or air produces vibrations at the edges of these openings resulting in the formation of turbulence which increases propulsive resistance against the water. There is the further handicap that the water and air which intrude from these openings become lodged between the swimwear and the swimmer's body, thus increasing the mass in motion. The combination of these phenomena increases propulsive resistance in the water, making it extremely difficult for swimmers participating in events in which the limits of their physical strength are being tested to improve their times.

Intrusion of water does not occur only from the above-mentioned openings, but also through the cloth of the swimwear in the vicinity of these openings. It has thus been proven that the above-mentioned problem cannot be solved merely by attaching the edges of these openings more firmly to the body.

The above-mentioned phenomena occur not only in the case of swimwear but in exactly the same manner also in the case of wear worn by competitors in cycling and skating events in which speed is of the essence and in which fluid resistance against air is a matter of importance.

SUMMARY OF THE INVENTION

The present invention has been made with a view to solving the above-mentioned problems. Its purpose is to provide clothing with reduced resistance to air and water, the favourable properties of fluid resistance of such clothing making it suitable in particular for use in sporting events. This purpose is achieved in the following ways:

(1) By preventing air or water from intruding from openings in the neck, sides, and back of clothing.
(2) By preventing air or water from intruding through the material of clothing in areas adjacent to said openings.
(3) By preventing vibration at the edges of the clothing caused by fluid stream.
(4) By preventing turbulence of the fluid stream on the surface of clothing.
(5) By preventing vibration of the wearer's skin next to the clothing.

The purpose of the clothing for reducing fluid resistance which is the subject of the present invention can be realized by covering the clothing adjacent to at least one of the openings of the neck, sides, and back of the clothing with patches made of a smooth-surfaced sheet which is airtight and water-proof. The said airtight and water-proof sheet is made of flexible resin sheet obtained by painting, attaching, forming, stamping, or mono-forming vinyl chloride, synthetic rubber, polyurethane, or silicon onto the surface of the material.

The above-mentioned patches of airtight and water-proof sheet may also be formed from a group of fragments of airtight and water-proof sheet arranged almost parallel to the direction of flow of the air or water when the clothing is worn.

The surface of the patches of airtight and water-proof sheet should preferably be constituted in such a manner that fine ridges and grooves or fine concave and convex rows are arranged in the direction of the air or water flow when the clothing is worn.

Furthermore, the patches of airtight and water-proof sheet should ideally be shaped in accordance with the contours of the wearer's body, to which they should adhere closely. This closely adhering structure should be such that it allows for temporary adhesion and can be removed between the wearer's skin.

The upper corners of the patches of airtight and water-proof sheet should be cover-formed in such a manner that they envelop the edges of the openings at the neck, sides and/or back of the clothing for reducing fluid resistance.

By covering the bottom part of the said clothing for reducing fluid resistance at least in the area of the wearer's upper thighs and by continuing the airtight and water-proof sheet covering the buttocks down to the upper thighs, it becomes possible to cover the surface of the body as it undulates during sporting events.

In addition, the surface of the airtight and water-proof sheet can be used for displaying information such as brand names, etc.

The above mentioned structure has the following effects:

(1) By covering in both directions the surface of the material of the clothing for reducing fluid resistance in the vicinity of the openings of the neck, sides, and back with patches of airtight and water-proof sheet or airtight and water-proof sheet made up of a collection of sheet fragments, thereby positively breaking the flow of air or water through the material, it becomes possible to prevent the absorption or ejection of air or water accompanying differences in internal and external pressure bordering on the material of the clothing for reducing fluid resistance, and to decrease turbulence of air or water on the surface of the airtight and water-proof sheet.

(2) Intrusion of air or water through the openings is prevented by means of a structure whereby the patches of airtight and water-proof sheet fit closely to the wearer's body, particularly at the edges of the neck, sides, and back, and, if necessary, to become temporarily attached so as to enable exfoliation between the wearer's skin.

(3) The patches of airtight and water-proof sheet are cover-formed in such a manner that their upper corners cover the openings at the neck, sides and/or back of the clothing for reducing fluid resistance, thereby preventing vibration at the edges caused by fluid flow.

(4) Reduction of propulsive resistance is achieved by rectifying air and water moving backwards by means of fine ridges and grooves or fine concave and convex rows.

The sum total of the above-mentioned actions is to bring about a decrease in propulsive resistance during races.

The following are the actions ancillary to the above:

(5) Controlling relaxation of the skin by having the patches of airtight and water-proof sheet attach firmly to the wearer's body makes it possible to reduce the resistance to air or water during a race. Furthermore, adoption of a structure whereby the surface of the body as it undulates as a consequence of movements of the fluid prevents the occurrence of turbulence and lessens resistance to air or water.

(6) Controlling relaxation of the skin by having the airtight and water-proof sheet attach firmly to the wearer's body improves the wearer's physical strength.

As well as lessening propulsive resistance as mentioned before, the clothing is thus effective as clothing for reducing fluid resistance for use in competitive events in which speed is of the essence.

As mentioned before, the following are the effects permitting improved finishing times in competitive sporting events of the clothing for reducing fluid resistance which is the subject of this invention:

(1) It is possible to prevent the absorption or ejection of air or water accompanying differences in internal and external pressure bordering on the material of the clothing for reducing fluid resistance, and to decrease turbulence of air or water on the surface of airtight and water-proof sheet.

(2) Intrusion of air or water through the openings of the clothing for reducing fluid resistance is prevented.

(3) Vibration at the edges of the clothing for reducing fluid resistance caused by fluid flow is prevented.

(4) Reduction of the propulsive resistance of the clothing for reducing fluid resistance is achieved by rectifying the flow of air and water.

(5) As well as decreasing resistance during sporting events by causing the material to adhere firmly to the wearer's body, it prevents undulations on the surface of the wearer's body.

Additional benefits resulting from realization of the above are as follows:

(6) It is possible to increase the physical strength of the wearer of the clothing for reducing fluid resistance.

(7) It becomes impossible to see through the material of the clothing for reducing fluid resistance.

It is also possible to arrange the airtight and water-proof sheet in such a manner as to emphasize the correct shape of the wearer's physique; this clothing is thus effective not merely as clothing for reducing resistance to fluids in sporting events but also as leisure clothing in forms such as fashionable swimming costumes, etc.

The following explanation in which reference is made to the accompanying drawings should clarify the other features and benefits of this invention.

BRIEF DESCRIPTION OF THE DRAWINGS

FIG. 8 is perspective view of the sheet showing the fourth example of an airtight and water-proof sheet patch.

FIG. 9 is an enlarged sectional view showing convex and concave rows of the sheet patch of FIG. 8.

FIG. 10 is a rear view of the bottom of the swimwear, indicating the fifth example.

DETAILED DESCRIPTION OF THE PREFERRED EMBODIMENT

We should like now to explain some practical examples of a clothing for reducing fluid resistance which is the subject of the present invention with reference to the drawings.

Figure 1:
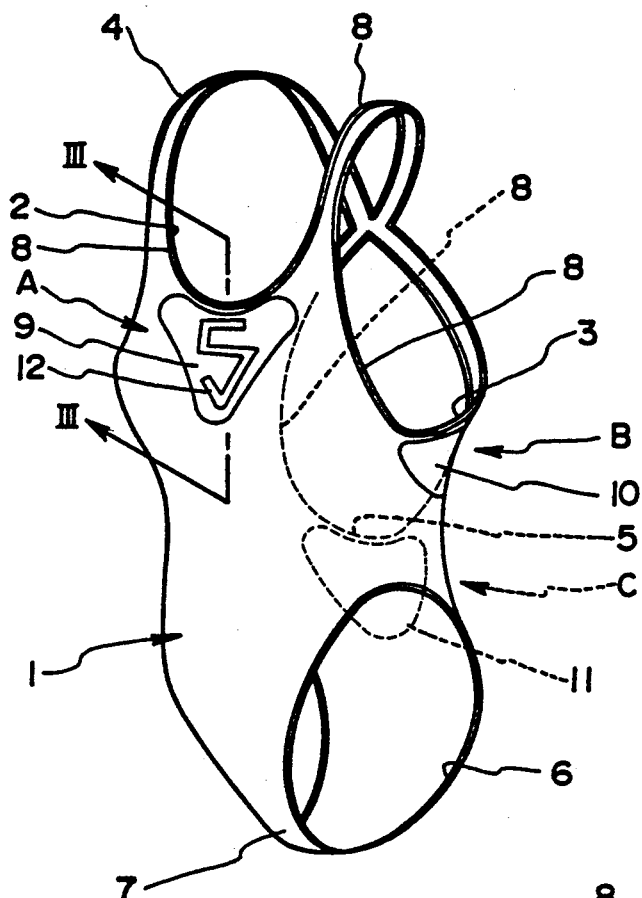
FIG. 1 is a perspective view of the first example of the swimwear which is the subject of the present invention.
Figure 2:
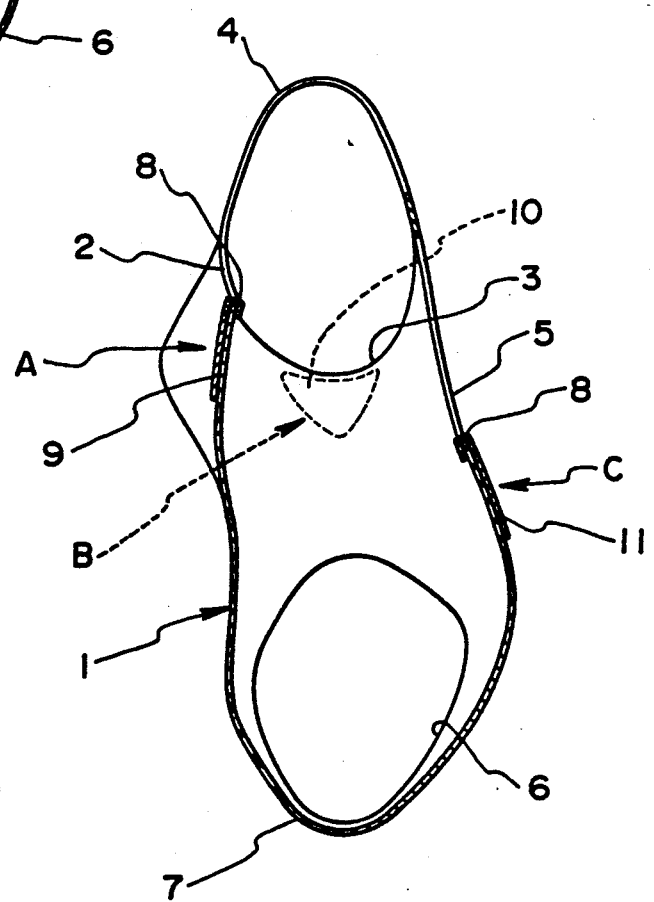
FIG. 2 is a sectional view of the side of the swimwear shown in FIG. 1.
Figure 3:
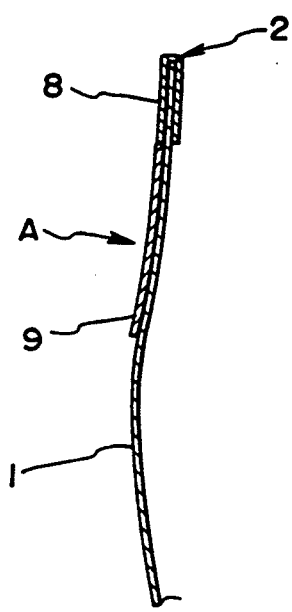
FIG. 3 is an enlarged sectional view along the lines III—III in FIG. 1.

FIGS. 1 to 3 show the first example of the invention, namely as swimwear for women. The swimwear as shown in FIG. 1 is sewn using various types of flexible fibrous materials or sheet materials. Both sides of the neck opening (2), the side cuts (3), and the shoulder strap (4) which extends from the side cuts (3) are joined at the centre of the top edge of the back cut (5) which is opened wide down to the hips. The bottom part is designed with two leg openings (6) and a crotch cloth section (7). The neck cut (2), the side cuts (3), and the back cut (5) are each trimmed by sewing edging cloth (8) on to their edges; the shoulder strap (4) is also equipped with the edging cloth (8). As to the surface of the swimwear (1), a chest patch of airtight and water-proof sheet (9) in a form similar to that of an inverted triangle with one border coming into contact with the edging cloth (8) at the centre of the neck opening (2) is attached to the sloping chest surface (arrow A); side patches of airtight and water-proof sheet (10) in a form similar to that of an inverted triangle with one border coming into contact with the edging cloth (8) at the centre of the side cuts (3) are attached to the sloping surfaces at the sides (arrow B); and a back patch of airtight and water-proof sheet (11) in a form similar to that of an inverted triangle with one border coming into contact with the edging cloth (8) at the centre of the back cut (5) is attached to the sloping surface on the lower back (arrow C).

The airtight and water-proof sheet patches (9), (10) and (11) are made by painting, affixing, forming, stamping or mono-forming a resin sheet with flexible properties, such as vinyl chloride, synthetic rubber, polyurethane, or silicon, onto the material of the swimwear (1). The inner side is curved so as to fit closely with the contours of the wearer's body. The surface is formed smoothly, and trademarks, names or other such displays (12) can be set on the patches of airtight and waterproof sheet (9) and (11) on the chest or back.

The patches of airtight and water-proof sheet (9), (10) and (11) are structured so as to fit firmly and closely to the body contours of the wearer, complementing the flexibility of the swimwear itself (1).

In consequence of this structure, when swimming with this swimwear, the chest sloping surface (arrow A) and the lower back sloping surface (arrow C) become such that the patches of airtight and water-proof sheet (9) and (11) assume a sloping shape in respect to the direction of water flow, with the result that the water coming into contact with said sheet patches glides past along the smooth surface. This means that there is no intrusion of water through the swimwear in the said areas (arrows A and C). Furthermore, water is expelled from the bottom section, thus making it possible for the swimwear (1) to fit firmly and closely to the contours of the swimmer's body. Although the side patches of airtight and water-proof sheet (10) which are attached on the sloping surfaces at the sides (arrow B) slope backwards in respect to the direction of water flow, the said patches prevent the swimwear from stretching and inhibit vibration at the edges. In consequence, water coming into contact with said sheet patches glides past along the smooth surface, making it possible for the swimwear (1) to fit firmly and closely to the contours of the swimmer's body. As a consequence of the fluidity resulting from the manner in which the airtight and water-proof sheet patches (9), (10) and (11) prevent water from intruding and form smooth surfaces, there is no absorption or ejection of water caused by differences in internal and external pressure bordering on the material of the swimwear, water turbulence on the patches of airtight and water-proof sheet can be lessened, and resistance to propulsion in the water can be reduced.

Figure 4:
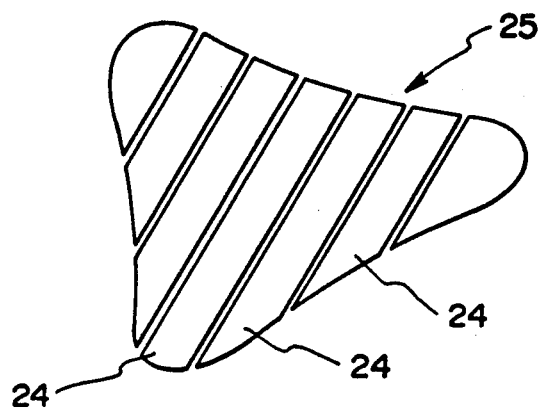
FIG. 4 is a perspective view of the sheet showing the second example of the airtight and water-proof sheet patches.

FIG. 4 shows another example of the above-mentioned patches of airtight and water-proof sheet (9), (10) and (11). Here we see a set of airtight and water-proof sheet patches (25) consisting of separated lengths of airtight and water-proof sheet (24), (24) . . . structured in such a manner that the patches are in the same direction as the flow of the fluid.

Figure 5:
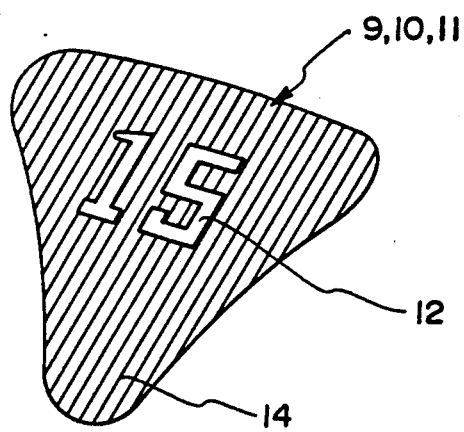
FIG. 5 is a perspective view of the sheet showing the third example of an airtight and water-proof sheet patch.
Figure 6:
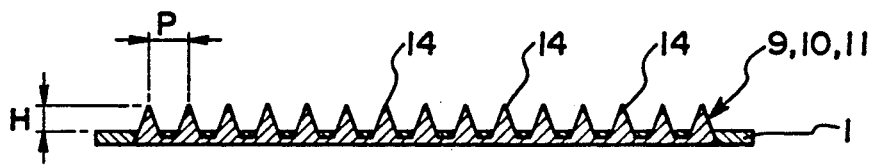
FIG. 6 is an enlarged sectional view showing the ridges and grooves on the sheet patch of FIG. 5.
Figure 7:
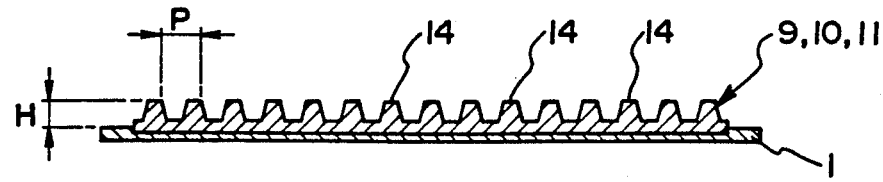
FIG. 7 is an enlarged sectional view showing other examples of ridges and grooves.

FIGS. 5 to 7 show other examples of the above-mentioned patches of airtight and water-proof sheet patches (9), (10) and (11) characterized by the formation of ridges and grooves (14) (height: min. 0.05 mm; pitch: max. 10 mm) situated on the surface of the sheet patches almost parallel to the direction of water movement. The cross section of the ridges and grooves (14) may be shaped in various different ways, as, for instance, in the triangular form shown in FIG. 6 or the stump-like form shown in FIG. 7.

To sum up, since the airtight and water-proof sheet is formed with ridges and grooves (14) almost parallel to the direction of water movement on the surface of the sheet patches, the water flows in the direction of the ridges and grooves (14), doing away with turbulence in other directions and thereby making it possible to display the effects of rectification and prevent turbulence at the rear.

As show in FIGS. 8 and 9, is also possible to arrange the patches of airtight and water-proof sheet (9), (10) and (11) in a series of convex and concave rows (23) (height: min. 0.05 mm; pitch: min. 0.1 mm; distance between rows: max. 10 mm) consisting of a large number of very small bumps (22), (22) . . . set almost parallel to the direction of movement of the water on the surface of the said sheet patches. As in the case of the above-mentioned ridges and grooves (14), these fine convex and concave rows (23) allow the water to flow past in the direction of the said rows and prevent the occurrence of turbulence in different directions, thereby exerting a rectification effect and preventing turbulence at the rear.

FIG. 10 shows an example of the airtight and water-proof sheet patches for the buttocks (15), (15) on the two buttocks parts of the swimwear (1).

The patches on the swimwear (1) are shaped so as completely to cover the buttocks of the wearer, the structure being such that the buttocks are tightly compressed by the tensile strength of the airtight and water-proof sheet patches for the buttocks (15), (15). As in the case of the other previously mentioned airtight and water-proof sheet patches, the airtight and water-proof sheet patches for the buttocks are able to prevent the inflow of water, to inhibit water turbulence on the sheet surface by means of fluidity caused by the smooth surface, and, in conjunction with the prevention of wave formation on the surface of the buttocks area as a result of tight fitting, to decrease resistance to propulsion in the water.

Figure 11:
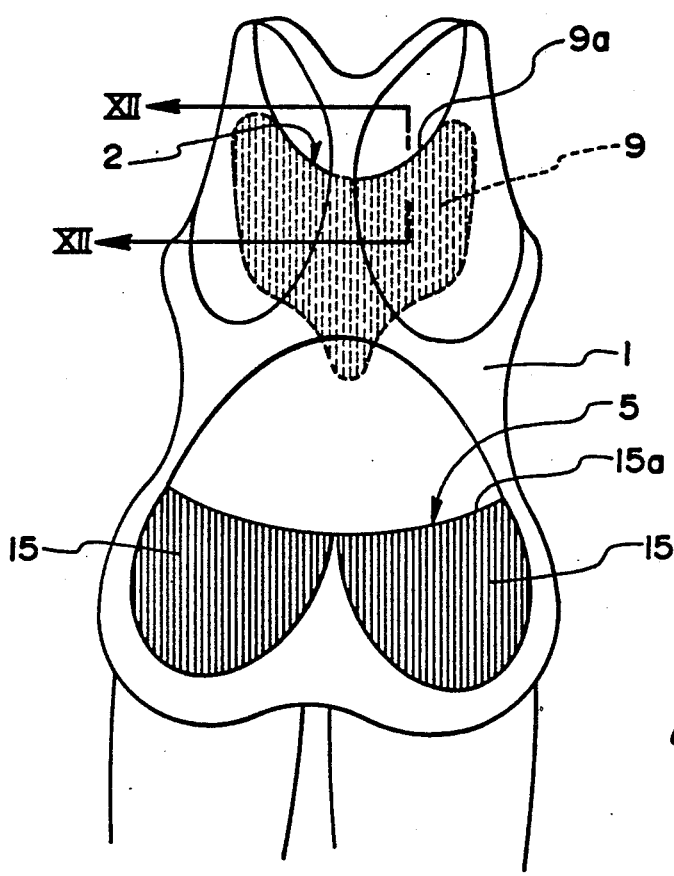
FIG. 11 is a rear view of the swimwear showing the sixth example.
Figure 12:
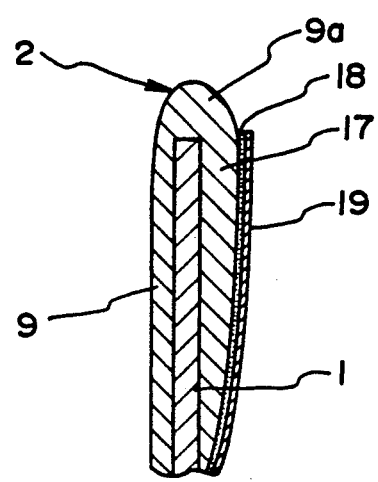
FIG. 12 is an enlarged view along the lines XII—XII in FIG. 11.

In FIGS. 11 and 12, we see swimwear in the case of which the trimming structure employing the edging cloth (8) of the neck opening (2) and the back cut (5) of the swimwear has been abandoned, and the edges of the material are formed by means of the upper edges (9a), (15a) of the airtight and water-proof sheet patch for the chest (9) and the airtight and water-proof sheet patches for the buttocks (15), (15). The inner surface of the airtight and water-proof sheet patch for the chest (9) is used as the dilated parts (17) covering both breasts of the wearer, and an adhesive layer (18) is formed on the surface of the dilated parts (17) by attaching peeling paper (18a) to the adhesive surface.

This structure results in the formation of upper edges (9a), (15a) continuing directly from the airtight and water-proof sheet patches (9), (15), in consequence of which not only it is possible to decrease exterior differences in level, but firm attachment of the edges to the wearer's skin caused by the tensile flexibility of the airtight and water-proof sheet patches (9), (15) is made possible, thereby forming a structure in which the intrusion of water from the edges is prevented. Furthermore, the structure whereby the peeling paper (18a) is peeled and affixed temporarily to the wearer's body makes it possible to prevent in a positive manner the intrusion of water from the edges.

Figure 13:
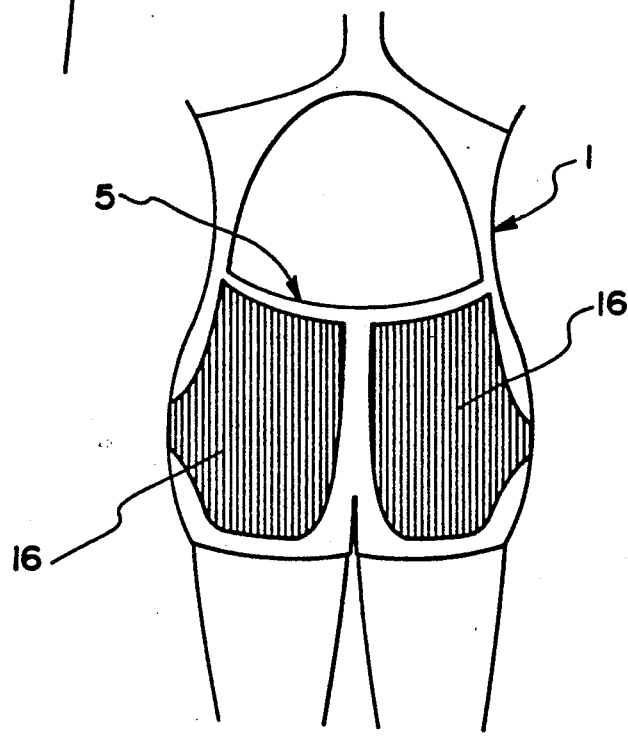
FIG. 13 is a rear view of the bottom of the swimwear showing the seventh example.

FIG. 13 shows an actual example of airtight and water-proof sheet patches on the buttocks area of swimwear (1) with a differently shaped bottom area.

The swimwear (1) in this example is shaped in the manner of trunks adhering closely to the body, being formed so that the bottom section provides covering down to buttocks and groin. The airtight and waterproof sheet patch for buttocks and lower buttocks (16) is formed in such a manner as to cover the buttocks and upper thigh sections of the said bottom section. In the structure employed in this example, the groin is covered by the airtight and water-proof sheet patch (16), with the result that formation of waves on the groin during swimming and turbulence can be prevented.

Figure 14:
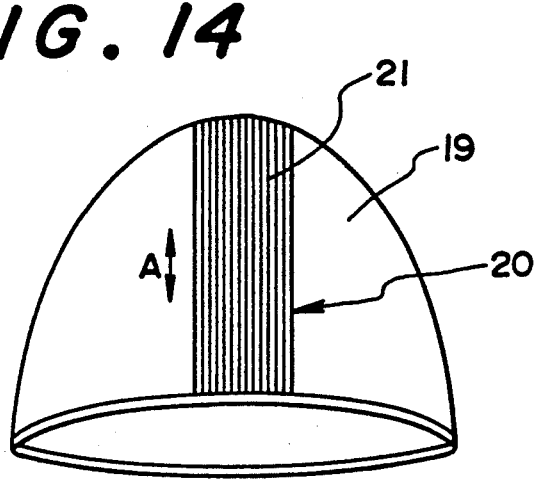
FIG. 14 is a front view implemented on a part of a swimming cap.

FIG. 14 shows an example of the airtight and water-proof sheet patches (20) which are the subject of this invention attached to part of a swimming cap (19), formed in such a manner that fine ridges and grooves (21) appear on the surface almost parallel to the flow of water during swimming.

Figure 15:
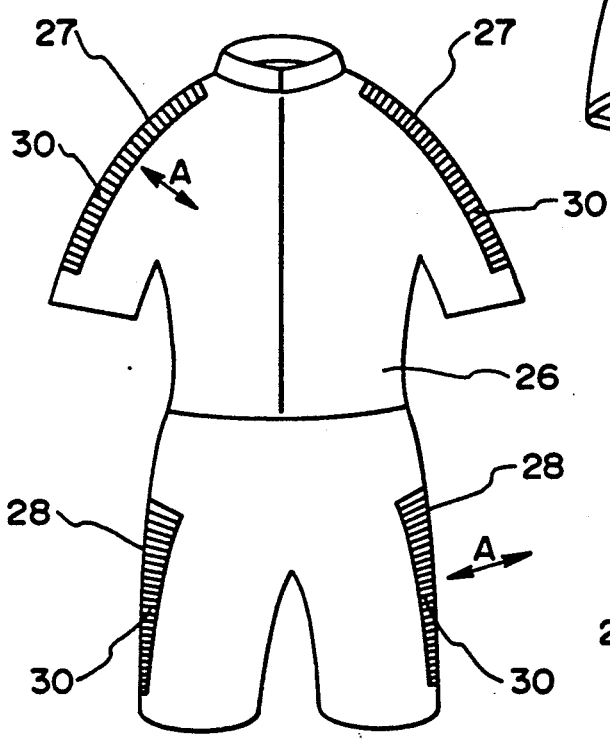
FIG. 15 is a front view showing an example of a suit for wear in cycling speed races.
Figure 16:
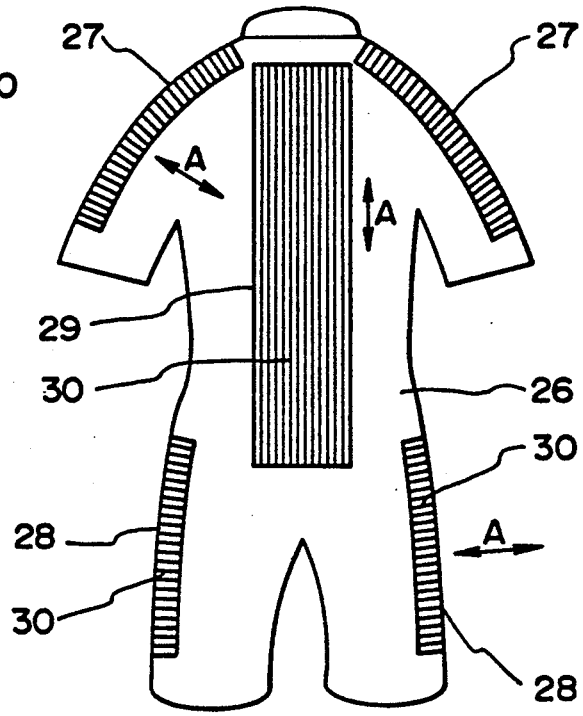
FIG. 16 is a rear view of the suit shown in FIG. 15.

FIGS. 15 and 16 show examples of cycle speed-racing suits where the problem is air resistance. In these examples, the constituent parts are the airtight and water-proof sheet patches for the shoulders (27) which stretches from both shoulders of the wear (26) to the sleeves, the airtight and water-proof sheet patches for the thighs (28) which cover both upper thighs, and the airtight and water-proof sheet patch for the back (29) which follows the line of the backbone. The direction of the fine ridges and grooves (30) of each of the airtight and water-proof sheet patches is determined, as shown by arrow A, in such a manner as to be almost parallel to the direction of the wind flow during use. The structure is thus one in which the airtight and water-proof sheet patches for the shoulders (27) and the airtight and water-proof sheet patches for the thighs (28) are structured so that the fine ridges and grooves (30) extend in the direction intersecting the arms or legs piercing the sleeves and upper thigh sections.

It goes without saying that the area of the airtight and water-proof sheet shown in each of the above examples can be increased or decreased as necessary, and that the sheet may cover almost the whole area of the swimwear to the extent that such does not inhibit movement.

The present commentary has been concerned with explaining in detail the most favourable embodiments of this invention. However, it is clear that there are many other possible embodiments which accord with the concepts and range of the invention. For this reason, any other embodiments apart from those specified in the attached claims shall not in any way be bound by these specific embodiments.

We claim:

1. A clothing article of fibrous cloth or sheet cloth comprising:
    a neck opening;
    side cuts;
    a back cut; and
    at least one patch of a smooth-surfaced, airtight and waterproof material covering a portion of said clothing article, wherein said at least one patch is adjacent to one of said neck opening, side cuts, or back cut to reduce fluid resistance of the clothing article.

2. A clothing article as recited in claim 1, wherein said at least one patch comprises a group of airtight and water-proof sheet fragments arranged in rows.

3. A clothing article as recited in either one of claims 1 or 2, wherein said at least one patch comprises a flexible sheet of resin material selected from the group consisting of vinyl chloride, synthetic rubber, polyurethane and silicon; and wherein the sheet is secured to the surface of the clothing.

4. A clothing article as recited in claim 1, wherein the patch is shaped according to contours of the body of a wearer wearing the clothing, and wherein said at least one patch adheres closely to the body of the wearer.

5. A clothing article as recited in claim 1, wherein a separate patch is provided adjacent to each of two side cuts, the neck cut, and the back cut, and wherein an upper edge of each patch serves, respectively, as an edge of said neck opening, one of said side cuts, and the back cut.

6. A clothing article as recited in claim 1, further comprising edging cloth forming an edge of the neck opening, an edge along the side cuts, and an edge along the back cut, and wherein said at least one patch has an upper edge in contact with the edging cloth.

7. A clothing article as recited in claim 1, wherein a bottom part of the clothing is shaped so as to envelop at least the upper thigh of a wearer, and wherein said at least one patch covers the buttocks of the wearer and continues down to the upper thighs of the wearer.

8. A clothing article as recited in claim 1, wherein said at least one patch has an inner side which can be affixed temporarily to the contours of the wearer.

9. A clothing article as recited in claim 1, wherein the surface of said at least one patch has a surface available for displays such as brand names.

10. A clothing article of fibrous cloth or sheet cloth comprising:
    a neck opening;
    side cuts;
    a back cut; and
    at least one patch of an airtight and water-proof material covering a portion of said clothing article;
    wherein said at least one patch is adjacent to at least one of said neck opening, side cuts, and back cut to reduce fluid resistance of the clothing article, wherein fine ridges and grooves are formed on a surface of said at least one patch and wherein the ridges and grooves are arranged along an axis of direction of flow of fluid past the article.

11. A clothing article as recited in claim 10, wherein the at least one patch comprises a group of airtight and water-proof sheet fragments arranged in rows.

12. A clothing article of fibrous cloth or sheet cloth comprising:
    a neck opening;
    side cuts;
    a back cut; and
    at least one patch of an airtight and water-proof material covering a portion of said clothing article;
    wherein said at least one patch is adjacent to at least one of said neck opening, side cuts, and back cut to reduce fluid resistance of the clothing article, wherein fine concave and convex rows are formed on a surface of said at least one patch and the direction of the concave and convex rows is arranged in a direction of flow of fluid past the article.

13. A clothing article as recited in claim 12, wherein the at least one patch comprises a group of airtight and water-proof sheet fragments arranged in rows.

* * * * *